(12) United States Patent
Li et al.

(10) Patent No.: US 8,768,091 B2
(45) Date of Patent: Jul. 1, 2014

(54) METHOD FOR GENERATING SKETCH IMAGE AND DISPLAY APPARATUS APPLYING THE SAME

(75) Inventors: Yu Li, Suwon-si (KR); Min-jung Kim, Seoul (KR); Dong-wook Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 366 days.

(21) Appl. No.: 13/160,087

(22) Filed: Jun. 14, 2011

(65) Prior Publication Data

US 2011/0311157 A1 Dec. 22, 2011

(30) Foreign Application Priority Data

Jun. 17, 2010 (KR) ........................ 10-2010-0057667

(51) Int. Cl.
*G06K 9/40* (2006.01)

(52) U.S. Cl.
USPC .............. 382/274; 345/77; 345/690; 348/671

(58) Field of Classification Search
USPC ............ 345/77, 690; 348/254, 671, 673, 687; 358/302; 382/169, 274

See application file for complete search history.

(56) References Cited

U.S. PATENT DOCUMENTS

| | | | | |
|---|---|---|---|---|
| 4,663,660 A | * | 5/1987 | Fedele et al. | ................ 375/240.1 |
| 5,193,122 A | * | 3/1993 | Kowalski et al. | ............. 382/173 |
| 5,585,859 A | * | 12/1996 | Ward et al. | .................... 348/619 |
| 6,608,700 B1 | * | 8/2003 | Mantell | .......................... 358/1.9 |
| 7,039,216 B2 | * | 5/2006 | Shum et al. | .................... 382/100 |
| 2008/0075381 A1 | | 3/2008 | Ishimaru | |
| 2010/0177163 A1 | * | 7/2010 | Yang et al. | ...................... 348/45 |

\* cited by examiner

*Primary Examiner* — Gregory F Cunningham
(74) *Attorney, Agent, or Firm* — Sughrue Mion, PLLC

(57) ABSTRACT

A sketch image is generated based on a brightness of a pixel block that includes a pixel and at least one pixel surrounding the pixel. An output gray scale of the specific pixel is adjusted based on whether an input gray scale of the specific pixel is higher than the representative value. Accordingly, the display apparatus may generate a clear sketch image.

16 Claims, 3 Drawing Sheets

METHOD FOR GENERATING SKETCH IMAGE AND DISPLAY APPARATUS APPLYING THE SAME

CROSS-REFERENCE TO RELATED APPLICATIONS

This application claims priority from Korean Patent Application No. 2010-57667, filed in the Korean Intellectual Property Office on Jun. 17, 2010, the disclosure of which is incorporated herein by reference in its entirety.

BACKGROUND

1. Field

Methods and apparatuses consistent with exemplary embodiments relate to generating a sketch image, and more particularly, to a method generating a sketch image by adding a sketch effect to an original image, and a display apparatus using the same.

2. Description of Related Art

A display apparatus may support various functions, in addition to photographing function. One of the functions supported by the display apparatus may be a non-photo-realistic rendering (NPR) function.

NPR is an image processing technique in which an image is processed by adding various effects, so that the image may look unrealistic. In order to emphasize the theme of the image, part of the image are exaggerated or omitted in the NPR-processed image. Such an NPR technique is widely used in the gaming, animation, advertisement, and movie industries.

There are many ways to apply NPR to an input image, including expressing an image in color-pencil paint, pen paint, oil paint, watercolor paint, cartoon, and sketch paint.

Among the above, creating a sketch effect requires a complicated algorithm. Thus, if a sketch effect is implemented in software, the sketch effect slows the processing speed down. If the sketch effect is implemented in hardware, the hardware structure becomes very complicated.

Accordingly, a method for providing an NPR sketch effect with a simple algorithm is required.

SUMMARY

One or more the exemplary embodiments provide a sketch image generating method in which a representative value corresponding to a brightness of a pixel block, which includes a specific pixel of an image and at least one pixel surrounding the specific pixel, is calculated, and an output gray scale of the specific pixel is adjusted based on whether an input gray scale of the specific pixel is higher than the representative value, and a display apparatus applying the same.

According to an aspect of an exemplary embodiment, there is provided a method of generating a sketch image of an input image includes calculating a representative value corresponding to brightness of a pixel block, the pixel block including a specific pixel of an image and at least one pixel of the image surrounding the specific pixel, determining whether an input gray scale of the specific pixel is higher than the representative value, and outputting an output gray scale of the specific pixel based on a result of the determining.

The outputting may include outputting the output gray scale of the specific pixel having a maximum gray scale in response to determining that the input gray scale of the specific pixel is higher than the representative value.

The outputting may include outputting the output gray scale of the specific pixel having a value lower than the input gray scale in response to determining that the input gray scale of the specific pixel is below the representative value.

The outputting may include outputting the output gray scale of the specific pixel by applying an equation below, wherein x indicates the input gray scale, y indicates the output gray scale, M indicates the representative value, a and b indicate a curve fitting parameter, and M_p indicates a mapping value of a curve:

$$\begin{cases} y = 255, & x > M \\ y = ax^2 + bx, & x <= M \end{cases}$$

$$v1 = \begin{cases} M\_p, & M > M\_p \\ M/2, & M \le M\_p \end{cases}$$

$$v2 = M\_v$$

$$b = \frac{255 * v1 * v1 - M * M * v2}{M * v1 * (v1 - M)}$$

$$a = \frac{255 - b * M}{M * M}$$

The outputting may include outputting the output gray scale of the specific pixel by applying an equation below, wherein x indicates the input gray scale, y indicates the output gray scale, M indicates the representative value, a and b indicate a curve fitting parameter, and M_p indicates a mapping value of a curve:

$$\begin{cases} y = 255, & x > M \\ y = a(e^x - 1) & x <= M \end{cases}$$

$$v1 = \begin{cases} M\_p, & M > M\_p \\ M/2, & M \le M\_p \end{cases}$$

$$v2 = M\_v$$

$$b = \frac{255 * v1 * v1 - M * M * v2}{M * v1 * (v1 - M)}$$

$$a = \frac{255 - b * M}{M * M}$$

The outputting may include outputting comprises outputting the input gray scale of the specific pixel as the output gray scale in response to determining that the representative value is below a specific threshold value.

The outputting may include outputting the input gray scale of the specific pixel as the output gray scale in response to determining that the representative value is below a specific threshold value, determining whether the input gray scale is higher than the representative value in response to determining that the representative value exceeds the specific threshold value, outputting the output gray scale of the specific pixel having a maximum gray scale in response to determining that the input gray scale of the specific pixel is higher than the representative value, and outputting the output gray scale of the specific pixel having a value lower than the input gray scale in response to determining that the input gray scale of the specific pixel is lower than the representative value.

The representative value may indicate an average gray scale of the pixel block including the specific pixel and the at least one pixel surrounding the specific pixel.

The calculating may include calculating the representative value of a gray scale image of the input image including only bright elements of all pixels of the input image.

According to an aspect of an exemplary embodiment, there is provided a display apparatus an image processing unit which calculates a representative value corresponding to brightness of a pixel block of an input image, the pixel block including a specific pixel of an image and at least one pixel of the image surrounding the specific pixel, determines whether an input gray scale of the specific pixel is higher than the representative value, and outputs an output gray scale of the specific pixel based on a result of the determining and a display apparatus which displays the processed image as a sketch image.

The image processing unit may output the output gray scale of the specific pixel having a maximum gray scale in response to determining that the input gray scale of the specific pixel is higher than the representative value.

The image processing unit may output the output gray scale of the specific pixel having a value lower than the input gray scale in response to determining that the input gray scale of the specific pixel is below the representative value.

The image processing unit may output the output gray scale of the specific pixel by applying an equation below, wherein x indicates the input gray scale, y indicates the output gray scale, M indicates the representative value, a and b indicate a curve fitting parameter, and M_p indicates a mapping value of a curve:

$$\begin{cases} y = 255, & x > M \\ y = ax^2 + bx, & x <= M \end{cases}$$

$$v1 = \begin{cases} M\_p, & M > M\_p \\ M/2, & M \leq M\_p \end{cases}$$

$$v2 = M\_v$$

$$b = \frac{255 * v1 * v1 - M * M * v2}{M * v1 * (v1 - M)}$$

$$a = \frac{255 - b * M}{M * M}$$

The image processing unit may output the output gray scale of the specific pixel by applying an equation below, wherein x indicates the input gray scale, y indicates the output gray scale, M indicates the representative value, a and b indicate a curve fitting parameter, and M_p indicates a mapping value of a curve:

$$\begin{cases} y = 255, & x > M \\ y = a(e^x - 1) & x <= M \end{cases}$$

$$v1 = \begin{cases} M\_p, & M > M\_p \\ M/2, & M \leq M\_p \end{cases}$$

$$v2 = M\_v$$

$$b = \frac{255 * v1 * v1 - M * M * v2}{M * v1 * (v1 - M)}$$

$$a = \frac{255 - b * M}{M * M}$$

The image processing unit may output the input gray scale of the specific pixel as the output gray scale in response to determining that the representative value is below a specific threshold value.

The image processing unit may output the input gray scale of the specific pixel as the output gray scale in response to determining that the representative value is below a specific threshold value, determine whether the input gray scale is higher than the representative value in response to determining that the representative value exceeds the specific threshold value, outputs the output gray scale of the specific pixel having a maximum gray scale in response to determining that the input gray scale of the specific pixel is higher than the representative value, and outputs the output gray scale of the specific pixel having a value lower than the input gray scale in response to determining that the input gray scale of the specific pixel is lower than the representative value.

The representative value may indicate an average gray scale of the pixel block including the specific pixel and the at least one pixel surrounding the specific pixel.

The image processing unit may extract a gray scale image of the input image including only bright elements of all pixels of the input image and generates the sketch image using the gray scale image.

As described above, according to various exemplary embodiments, a sketch image generating method, in which a representative value corresponding to brightness of a pixel block including a specific pixel of an image and at least one pixel surrounding the specific pixel, is calculated, and an output gray scale of the specific pixel is adjusted based on whether an input gray scale of the specific pixel is higher than the representative value and a display apparatus applying the same are provided. Thus, a clearer sketch image may be generated. In addition, according to an exemplary embodiment, the sketch image is generated using a simple algorithm, and thus a hardware structure for generating the sketch image may become simplified.

BRIEF DESCRIPTION OF THE DRAWINGS

The above and other aspects will be more apparent by describing certain exemplary embodiments with reference to the accompanying drawings, in which.

DETAILED DESCRIPTION

Figure 1:
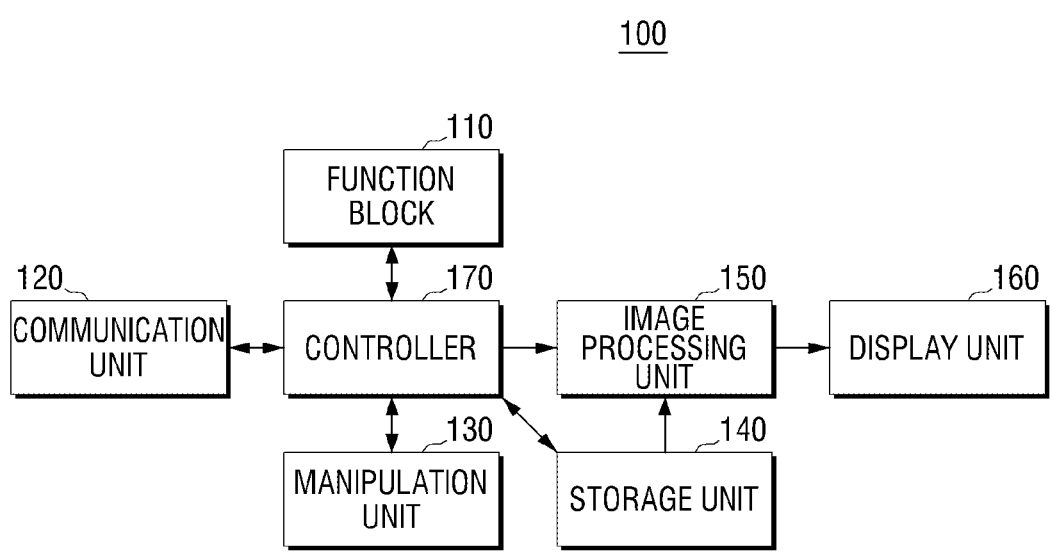
FIG. 1 is a block diagram illustrating a structure of a digital photo frame, according to an exemplary embodiment.

Certain exemplary embodiments are described below with reference to the accompanying drawings.

In the following description, like drawing reference numerals are used for the like elements, even in different drawings. The matters defined in the description, such as detailed construction and elements, are provided to assist in a comprehensive understanding of the exemplary embodiments. However, the exemplary embodiments can be practiced without those specifically defined matters. Also, well-known functions or constructions are not described in detail since they would obscure the application with unnecessary detail.

FIG. 1 is a block diagram illustrating a structure of a digital photo frame 100 according to an exemplary embodiment. As illustrated in FIG. 1, the digital photo frame 100 comprises a function block 110, a communication unit 120, a manipulation unit 130, a storage unit 140, an image processing unit 150, a display unit 160, and a controller 170.

The function block 110 performs a function of the digital photo frame 100. For example, the function block 110 reproduces images (particularly, photos and videos).

The communication unit 120 is communicably connected to an external apparatus (not shown) through a mobile communication network or an Internet network, and may download image contents from the external apparatus.

The manipulation unit 130 is manipulated by a user to input a user command. Specifically, the manipulation unit 130 receives manipulation corresponding to a command to select various items displayed on the display unit 160 from the user. The manipulation unit 130 may be realized as a touch screen, a button, a mouse, a touch pad, or a remote controller.

The storage unit 140 stores programs and applications to perform the functions of the digital photo frame 100. In addition, the storage unit 140 may store image data. The storage unit may be a computer-readable medium, such as a read-only memory (ROM), random access memory (RAM), flash memory, or the like.

The image processing unit 150 processes input image data and outputs the processed data to the display unit 160. In this case, in order to generate a sketch image for the input image, the image processing unit 150 may perform NPR on the input image.

Herein, the input image may include at least one of an image signal or image data input from the external apparatus through the communication unit 120 and an image signal or image data input to the image processing unit 150 from the storage unit 140.

In order to generate a sketch image, the image processing unit 150 extracts a gray scale image of the input image. Herein, the gray scale image refers to an image that includes only bright elements of the input image, that is, a black and white image of the input image. The image processing unit 150 uses the gray scale image during the process of generating a sketch image, which will be explained below. In other words, the input image in the following process represents a gray scale image extracted from the input image.

The image processing unit 150 calculates a representative value corresponding to a brightness of a pixel block including a specific pixel of an input image and at least one pixel surrounding the specific pixel. Herein, the specific pixel refers to a pixel to be NPR-processed to generate a sketch image, and the pixel block refers to a group of pixels including the specific pixel and its surrounding pixels. For example, the pixel block may include M*N pixels (M and N are natural numbers) with respect to a specific pixel.

The representative value refers to a value which can represent the brightness of the pixel block. For example, the representative value may be an average gray scale of the pixels included in the pixel block. That is, if the pixel block includes M*N pixels (M and N are natural numbers) with respect to a specific pixel, the representative value may be the average gray scale of the M*N pixels.

If a representative value is below a specific threshold value, the image processing unit 150 outputs an input gray scale of a specific pixel as an output gray scale. Herein, the threshold value refers to a value of brightness that defines a dark area of an input image. That is, the threshold value is a maximum value of brightness which is defined as a dark area. Accordingly, the area of the gray scale, which is below the threshold value, is defined as a dark area. If a representative value is below the threshold value, the image processing unit 150 outputs the input gray scale image.

Alternatively, if a representative value exceeds a specific threshold value, the image processing unit 150 adjusts an output gray scale of a specific pixel, according to whether an input gray scale of the specific pixel is higher than the representative value, so as to generate a sketch image of the input image.

Herein, the input gray scale refers to a gray scale of a specific pixel of an input image, and the output gray scale refers to a gray scale of a specific pixel of an output image, which is output from the image processing unit 150 after the input image is processed. That is, a gray scale of a specific pixel is input to the image processing unit 150 as an input gray scale, and output from the image processing unit 150 as an output gray scale.

Specifically, if an input gray scale of a specific pixel is higher than a representative value, the image processing unit 150 adjusts an output gray scale of the specific pixel to a maximum gray scale and outputs the adjusted value. If an input gray scale of a specific pixel is the same as or lower than a representative value, the image processing unit 150 adjusts an output value of the specific pixel to be lower than the input gray scale. The image processing unit 150 processes the image by applying relationship between a brightness level of an input image and a brightness level of an output image. The relationship may be illustrated as a convex curve on a graph, as will be discussed below.

For example, the image processing unit 150 may adjust an output gray scale of a specific pixel according to whether an input gray scale of the specific pixel is higher than a representative value by applying the following equation 1:

$$\begin{cases} y = 255, & x > M \\ y = ax^2 + bx, & x <= M \end{cases} \quad \text{[Equation 1]}$$

Herein, $$v1 = \begin{cases} M\_p, & M > M\_p \\ M/2, & M \le M\_p \end{cases}$$

$$v2 = M\_v$$

$$b = \frac{255 * v1 * v1 - M * M * v2}{M * v1 * (v1 - M)}$$

$$a = \frac{255 - b * M}{M * M}$$

In another example, the image forming apparatus may adjust an output gray scale of a specific pixel according to whether an input gray scale of the specific pixel is higher than a representative value by applying the following equation 2:

$$\begin{cases} y = 255, & x > M \\ y = a(e^x - 1) & x <= M \end{cases} \quad \text{[Equation 2]}$$

Herein, $$v1 = \begin{cases} M\_p, & M > M\_p \\ M/2, & M \le M\_p \end{cases}$$

$$v2 = M\_v$$

$$b = \frac{255 * v1 * v1 - M * M * v2}{M * v1 * (v1 - M)}$$

$$a = \frac{255 - b * M}{M * M}$$

In equation 1 and equation 2 above, 'x' refers to an input gray scale, 'y' refers to an output gray scale, 'M' refers to a representative value, and 'a' and 'b' refer to a curve fitting parameter, respectively. If an input gray scale is the same as M_p, M_v becomes a mapping value of a curve.

Figure 3:
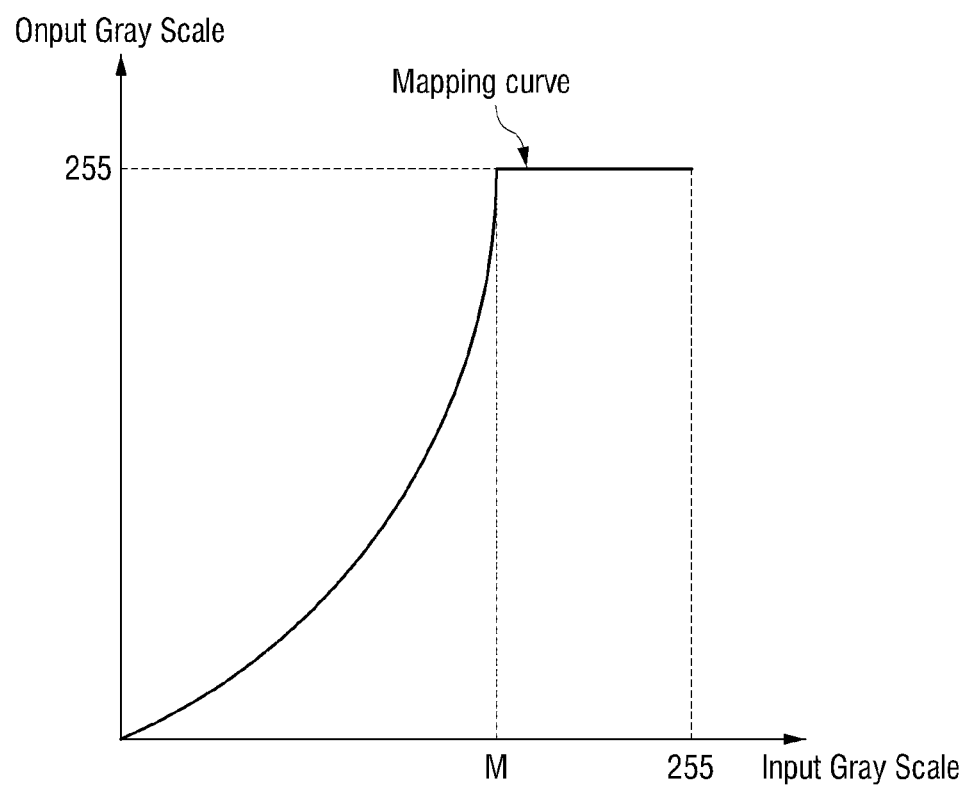
FIG. 3 is a view illustrating a mapping curve for generating a sketch image, according to an exemplary embodiment.

FIG. 3 illustrates a graph regarding the equation 1 and the equation 2, and is a view illustrating an example of a mapping curve for generating a sketch image, according to an exemplary embodiment.

As illustrated in FIG. 3, the mapping curve is a convex down curve when an input gray scale is below a representative value (M). A constant output gray scale 255 is output when an input gray scale is higher than a representative value (M).

As such, referring to equation 1 and equation 2 illustrated in FIG. 3, if an input gray scale (x) is higher than a representative value (M), an output gray scale (y) becomes 255, which is a maximum gray scale.

On the other hand, if an input gray scale (x) is the same or smaller than a representative value (M), an output gray scale (y) is determined by a separate curve equation. In this case, an output gray scale (y) of a specific pixel is adjusted to be a value smaller than an input gray scale (x), since the curve is a convex down curve.

If an input image is processed by a curve to which the above equation is applied, a pixel which is darker than surrounding pixels becomes darker, and a pixel which is brighter than surrounding pixels becomes brighter. Accordingly, image contrast increases and the sketch effect improves.

As described above, the image processing unit 150 outputs an output gray scale, in which an input gray scale of each pixel is processed, according to the above-mentioned conditions. In addition, the image processing unit 150 generates and outputs a sketch image corresponding to an input image by performing the above-mentioned processing on every pixel.

In particular, the image processing unit 150 may enhance sketch effect as the image processing unit 150 determines an output gray scale by generating a representative value of a specific pixel and comparing the representative value with an input gray scale.

The display unit 160 displays a sketch image generated by the image processing unit 150. The display unit 160 may be a liquid crystal display (LCD), a plasma display panel (PDP), or an active matrix organic light emitting diodes (AMOLED).

The controller 170 controls overall functions of the digital photo frame 100 according to a user's manipulation of the manipulation unit 130. In addition, the controller 170 controls the image processing unit 150 to perform the above-mentioned functions and operations. The controller may be a microprocessor or a central processing unit (CPU) that controls the overall operation of the digital photo frame 100.

Through the above-described configuration, the digital photo frame 100 may generate and display a sketch image of an input image. In addition, the digital photo frame 100 may enhance a sketch effect, as the digital photo frame 100 increases contrast using a representative value. Since the digital photo frame 100 generates a sketch image using a simple algorithm, as described above, a hardware structure for generating a sketch image may become simplified.

Figure 2:
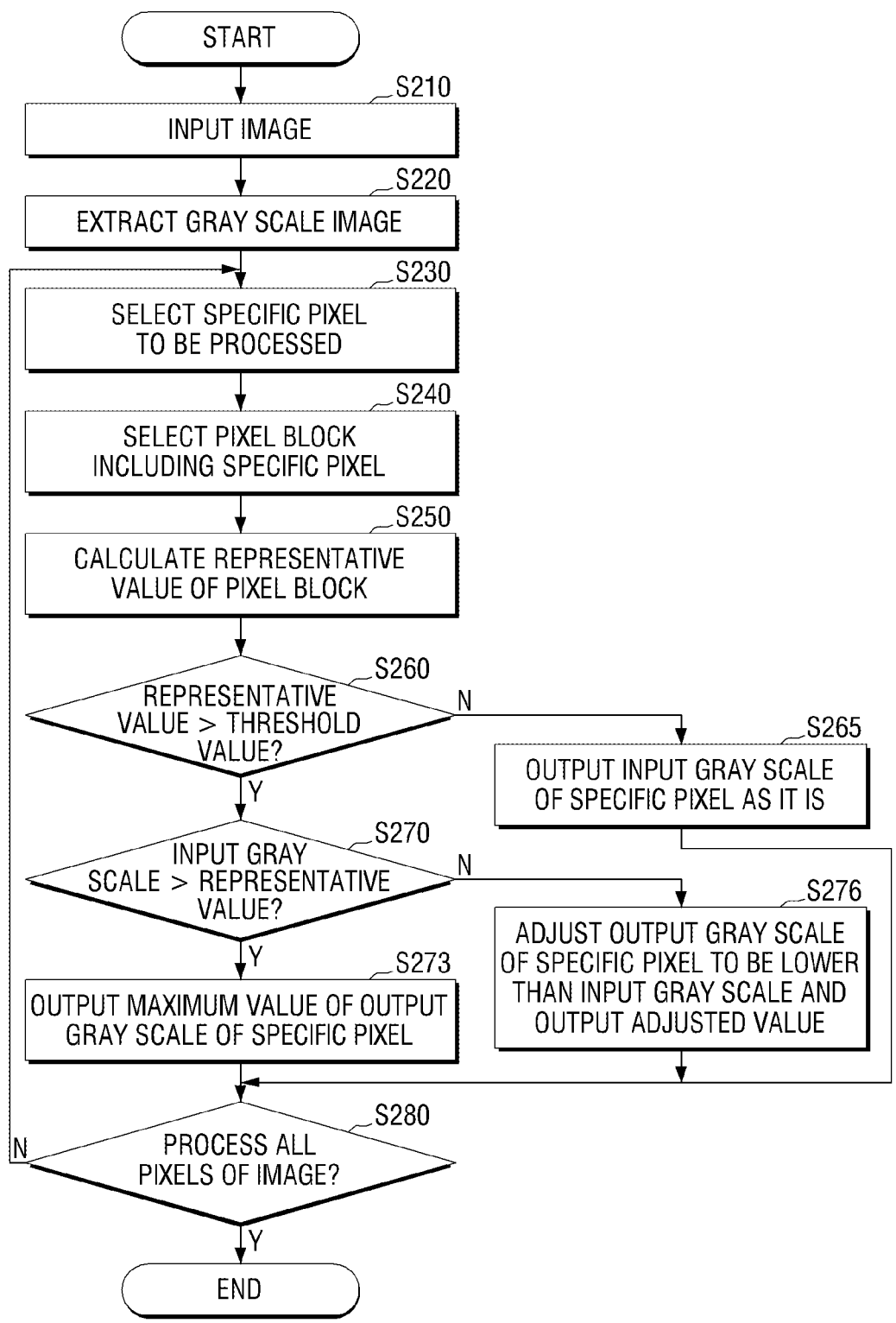
FIG. 2 is a flowchart illustrating a sketch image generating method, according to an exemplary embodiment.

FIG. 2 is a flowchart to explain a sketch image generating method, according to an exemplary embodiment.

The digital photo frame 100 receives an input image (S210). Herein, the input image includes an image signal input or image data received from an external source or from a storage medium of the digital photo frame 100.

The digital photo frame 100 extracts a gray scale of the input image in order to generate a sketch image (S220). Herein, the gray scale image represents an image including only bright elements of the input image, that is, a black and white image of the input image. The digital photo frame 100 uses the gray scale image during the process of generating a sketch image. In other words, an input image represents a gray scale image extracted from the input image.

Subsequently, the digital photo frame 100 selects a specific pixel to be processed to generate a sketch image (S230). In addition, the digital photo frame 100 selects a pixel block including the specific pixel and pixels surrounding the specific pixel (S240).

The digital photo frame 100 calculates a representative value corresponding to brightness of the pixel block (S250). The representative value refers to a value which can represent brightness of the pixel block. For example, the representative value may be an average gray scale of the pixels included in the pixel block. That is, if the pixel block includes M*N pixels (M and N are natural numbers) with respect to the specific pixel, the representative value may be an average gray scale of M*N pixels.

The digital photo frame 100 determines whether the representative value is higher than a threshold value (S260). If it is determined that the representative value is below a specific threshold value (S260-N), an input gray scale of the specific pixel becomes an output gray scale (S265). Herein, the threshold value refers to a value of brightness that defines a dark area of an input image. That is, the threshold value is a maximum value of brightness which is defined as a dark area. Accordingly, the area having gray scale below the threshold value is defined as a dark area. If a representative value is below the threshold value, the digital photo frame 100 retains the input gray scale as the output gray scale.

If a representative value exceeds a specific threshold value (S260-Y), the digital photo frame 100 determines whether an input gray scale is higher than the representative value (S270). If it is determined that the input gray scale is higher than the representative value (S270-Y), the digital photo frame 100 adjusts an output gray scale of a specific pixel to a maximum gray scale (S273).

However, if an input gray scale of a specific pixel is the same as or lower than a representative value (S270-N), the digital photo frame 100 adjusts an output value of the specific pixel to be lower than the input gray scale (S276). To do so, the digital photo frame 100 processes the image by applying a convex down curve in a graph describing the relationship between a brightness level of an input image and a brightness level of an output image. The curve has been explained above with reference to FIG. 3, equation 1 and equation 2.

Subsequently, the digital photo frame 100 determines whether every pixel of the input image is processed (S280). If every pixel is not processed (S280-N), a pixel to be processed next is selected (S230).

On the other hand, if every pixel is processed (S280), the digital photo frame 100 completes a process of generating a sketch image corresponding to the input image.

Through the above process, the digital photo frame 100 may generate a sketch image of an input image. As the digital photo frame 100 determines an output gray scale by generating a representative value of a specific pixel and comparing the representative value with an input gray scale, the digital photo frame 100 may enhance the sketch effect.

In the exemplary embodiment, the display apparatus is set to be the digital photo frame 100, but this is only an example. The above-described aspects may be applied to any display apparatus which performs NPR-processing on an input image and displays the processed image. For example, the display apparatus may be not only a digital photo frame but also a digital camera, a camcorder, a personal media player (PMP), an MP3 player, a mobile phone, a notebook computer, a personal digital assistant (PDA), or the like.

The exemplary embodiments can also be embodied as computer readable codes on a computer readable recording medium. The computer readable recording medium is any data storage device that can store data, which can be thereafter read by a computer system to execute the computer readable codes stored thereon.

The digital photo frame 100 illustrated in FIG. 1 may include a bus coupled to every unit of the apparatus, at least one processor connected to the bus, and memory connected to the bus to store commands, received messages, and generated messages, and the processor executes the commands and controls the operations of the apparatuses.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. In an alternative embodiment, the exemplary embodiments can also be embodied as computer readable transmission media, such as carrier waves, for transmission over a network.

Although a few exemplary embodiments have been shown and described, it would be appreciated by those skilled in the art that changes may be made without departing from the principles and spirit of the invention, the scope of which is defined in the claims and their equivalents.

What is claimed is:

1. A method of generating a sketch image of an input image, the method comprising:
   calculating a representative value corresponding to brightness of a pixel block, the pixel block including a specific pixel of an image and at least one of the pixels of the image which surround the specific pixel;
   determining whether an input gray scale value of the specific pixel is higher than the representative value corresponding to the brightness of the pixel block; and
   outputting an output gray scale of the specific pixel, which is adjusted, based on a result of the determining,
   wherein the outputting comprises outputting the output gray scale of the specific pixel having a maximum gray scale if the input gray scale value of the specific pixel is higher than the representative value, and
   wherein the outputting comprises outputting the output gray scale of the specific pixel having a value lower than the input gray scale value in response to determining that the input gray scale value of the specific pixel is below the representative value.

2. The method as claimed in claim 1, wherein the outputting comprises outputting the output gray scale of the specific pixel by applying an equation below, wherein x indicates the input gray scale, y indicates the output gray scale, M indicates the representative value, a and b indicate a curve fitting parameter, and M_p indicates a mapping value of a curve:

$$\begin{cases} y = 255, & x > M \\ y = ax^2 + bx, & x <= M \end{cases}$$

$$v1 = \begin{cases} M\_p, & M > M\_p \\ M/2, & M \leq M\_p \end{cases}$$

$$v2 = M\_v$$

$$b = \frac{255 * v1 * v1 - M * M * v2}{M * v1 * (v1 - M)}$$

$$a = \frac{255 - b * M}{M * M}.$$

3. The method as claimed in claim 1, wherein the outputting comprises outputting the output gray scale of the specific pixel by applying an equation below, wherein x indicates the input gray scale, y indicates the output gray scale, M indicates the representative value, a and b indicate a curve fitting parameter, and M_p indicates a mapping value of a curve:

$$\begin{cases} y = 255, & x > M \\ y = a(e^x - 1) & x <= M \end{cases}$$

$$v1 = \begin{cases} M\_p, & M > M\_p \\ M/2, & M \leq M\_p \end{cases}$$

$$v2 = M\_v$$

$$b = \frac{255 * v1 * v1 - M * M * v2}{M * v1 * (v1 - M)}$$

$$a = \frac{255 - b * M}{M * M}.$$

4. The method as claimed in claim 1, wherein the outputting comprises outputting the input gray scale value of the specific pixel as the output gray scale if the representative value is below a threshold value.

5. The method as claimed in claim 1, wherein the outputting comprises:
   outputting the input gray scale value of the specific pixel as the output gray scale if the representative value is below a specific threshold value;
   determining whether the input gray scale value is higher than the representative value if the representative value exceeds the specific threshold value.

6. The method as claimed in claim 1, wherein the representative value indicates an average gray scale of the pixel block including the specific pixel and the at least one pixel surrounding the specific pixel.

7. The method as claimed in claim 1, wherein the calculating comprises calculating the representative value of a gray scale image of the input image including only bright elements of all pixels of the input image.

8. A display apparatus comprising:
   an image processing unit which calculates a representative value corresponding to brightness of a pixel block of an input image, the pixel block including a specific pixel of an image and at least one pixel of the image which surrounds the specific pixel, determines whether an input gray scale value of the specific pixel is higher than the representative brightness value, and outputs an output gray scale of the specific pixel, which is adjusted, based on a result of the determining; and
   a display apparatus which displays the processed image as a sketch image,
   wherein the image processing unit outputs the output gray scale of the specific pixel having a maximum gray scale if the input gray scale value of the specific pixel is higher than the representative brightness value, and
   wherein the image processing unit adjusts an output gray scale of the specific pixel to be lower than the input gray scale value if the input gray scale value of the specific pixel is below the representative brightness value.

9. The display apparatus as claimed in claim 8, wherein the image processing unit outputs the output gray scale of the specific pixel by applying an equation below, wherein x indicates the input gray scale, y indicates the output gray scale, M indicates the representative value, a and b indicate a curve fitting parameter, and M_p indicates a mapping value of a curve:

$$\begin{cases} y = 255, & x > M \\ y = ax^2 + bx, & x <= M \end{cases}$$

$$v1 = \begin{cases} M\_p, & M > M\_p \\ M/2, & M \le M\_p \end{cases}$$

$$v2 = M\_v$$

$$b = \frac{255 * v1 * v1 - M * M * v2}{M * v1 * (v1 - M)}$$

$$a = \frac{255 - b * M}{M * M}.$$

10. The display apparatus as claimed in claim 8, wherein the image processing unit outputs the output gray scale of the specific pixel by applying an equation below, wherein x indicates the input gray scale, y indicates the output gray scale, M indicates the representative value, a and b indicate a curve fitting parameter, and M_p indicates a mapping value of a curve:

$$\begin{cases} y = 255, & x > M \\ y = a(e^x - 1) & x <= M \end{cases}$$

$$v1 = \begin{cases} M\_p, & M > M\_p \\ M/2, & M \le M\_p \end{cases}$$

$$v2 = M\_v$$

$$b = \frac{255 * v1 * v1 - M * M * v2}{M * v1 * (v1 - M)}$$

$$a = \frac{255 - b * M}{M * M}.$$

11. The display apparatus as claimed in claim 8, wherein the image processing unit outputs the input gray scale value of the specific pixel as the output gray scale if the representative value is below a threshold value.

12. The display apparatus as claimed in claim 8, wherein the image processing unit outputs the input gray scale value of the specific pixel as the output gray scale if the representative value is below a specific threshold value, determines whether the input gray scale value is higher than the representative value if the representative value exceeds the specific threshold value.

13. The display apparatus as claimed in claim 8, wherein the representative value indicates an average gray scale of the pixel block including the specific pixel and the at least one pixel surrounding the specific pixel.

14. The display apparatus as claimed in claim 8, wherein the image processing unit extracts a gray scale image of the input image including only bright elements of all pixels of the input image and generates the sketch image using the gray scale image.

15. A sketch image generating apparatus comprising:
a processor that receives an input image, converts the input image to a gray scale image of the input image, calculates a brightness value of a pixel block of the gray scale image, the pixel block comprising a first pixel of the gray scale image and a second pixel of the gray scale image that is adjacent to the first pixel, determines whether a brightness of the first pixel is greater than the brightness value, one of increases and decreases the brightness of the first pixel based on a result of the determining as an output pixel, and outputs the output pixel as a pixel of an output image,
wherein the processor outputs the output pixel having a maximum gray scale if the first pixel of the gray scale image is greater than the brightness value and the output pixel having a minimum gray scale if the first pixel of the gray scale image is smaller than the brightness value.

16. A non-transitory computer-readable recording medium having embodied thereon a program which, when executed by a computer causes the computer to execute a method of generating a sketch image of an input image, the method comprising:
calculating a representative brightness value corresponding to brightness of a pixel block, the pixel block including a specific pixel of an image and at least one pixel of the image which surrounds the specific pixel;
determining whether an input gray scale value of the specific pixel is higher than the representative brightness value; and
outputting an output gray scale of the specific pixel based on a result of the determining,
wherein the outputting comprises outputting the output gray scale of the specific pixel having a maximum gray scale if the input gray scale value of the specific pixel is higher than the representative brightness value and outputting the output gray scale of the specific pixel having a minimum gray scale if the input gray scale value of the specific pixel is lower than the representative brightness value.

\* \* \* \* \*